US011551381B2

(12) United States Patent
Kawamoto

(10) Patent No.: US 11,551,381 B2
(45) Date of Patent: Jan. 10, 2023

(54) INFORMATION PROCESSING DEVICE, INFORMATION PROCESSING SYSTEM, AND NON-TRANSITORY COMPUTER-READABLE MEDIUM STORING INFORMATION PROCESSING PROGRAM

(71) Applicant: Mitsubishi Electric Corporation, Tokyo (JP)

(72) Inventor: Kimihiko Kawamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 16/968,723

(22) PCT Filed: Mar. 14, 2018

(86) PCT No.: PCT/JP2018/009949
§ 371 (c)(1),
(2) Date: Aug. 10, 2020

(87) PCT Pub. No.: WO2019/176007
PCT Pub. Date: Sep. 19, 2019

(65) Prior Publication Data
US 2020/0402266 A1 Dec. 24, 2020

(51) Int. Cl.
*G06T 11/00* (2006.01)
*G06T 7/00* (2017.01)
(52) U.S. Cl.
CPC .......... *G06T 11/00* (2013.01); *G06T 7/0004* (2013.01); *G06T 2207/30141* (2013.01)
(58) Field of Classification Search
CPC ......... G06T 7/0004; G06T 2207/30141; G06T 11/00
See application file for complete search history.

(56) References Cited

U.S. PATENT DOCUMENTS 6,051,027 A * 4/2000 Kapur ............... G06F 30/23
703/13
10,779,398 B2 * 9/2020 Corral ............... H05K 3/1225
(Continued)

FOREIGN PATENT DOCUMENTS

| JP | 2000137822 A | 5/2000 |
|---|---|---|
| JP | 2012220477 A | 11/2012 |
| JP | 2016062365 A | 4/2016 |

OTHER PUBLICATIONS

International Search Report (PCT/ISA/210), with translation, and Written Opinion KPCT/ISA/237) dated Jun. 5, 2018, by the Japan Patent Office as the International Searching Authority for International Application No. PCT/JP2018/009949.
(Continued)

*Primary Examiner* — Phi Hoang
(74) *Attorney, Agent, or Firm* — Buchanan Ingersoll & Rooney PC

(57) ABSTRACT

An information processing system includes a terminal device and an information processing device. The terminal device captures an image of at least a portion of a printed board and transmits the captured image of the at least a portion of the printed board to the information processing device. Based on the captured image and design information items about a plurality of elements included in the printed board, the information processing device extracts design information items about one or more elements constituting the at least a portion of the printed board, and generates an image in which images based on the design information items about the one or more elements are superimposed on the captured image. The information processing device transmits the generated image to the terminal device. The
(Continued)

terminal device displays the generated image, received from the information processing device, on a display of the terminal device.

16 Claims, 10 Drawing Sheets

(56) References Cited

U.S. PATENT DOCUMENTS

| | | | | |
|---|---|---|---|---|
| 11,079,522 | B1* | 8/2021 | Dong | G06V 10/751 |
| 2002/0024675 | A1* | 2/2002 | Foxlin | G06F 3/0346 |
| | | | | 356/620 |
| 2004/0131232 | A1 | 7/2004 | Meisner et al. | |
| 2006/0238036 | A1* | 10/2006 | Nagata | H05K 1/0266 |
| | | | | 307/147 |
| 2010/0026960 | A1* | 2/2010 | Sprague | H04N 13/156 |
| | | | | 353/28 |
| 2011/0164163 | A1* | 7/2011 | Bilbrey | G06F 1/1694 |
| | | | | 348/333.01 |
| 2014/0002131 | A1* | 1/2014 | Shaeffer | H03K 19/017545 |
| | | | | 326/30 |
| 2015/0213187 | A1* | 7/2015 | Goyal | G01R 1/06788 |
| | | | | 716/136 |
| 2018/0136255 | A1* | 5/2018 | Albert | G01R 31/2806 |
| 2020/0200794 | A1* | 6/2020 | Niles | G01R 1/025 |

OTHER PUBLICATIONS

Shimizu, et al., "Development of a circuit board assembly supporting system using AR technology", The Proceedings of the 2017 JSME Annual Conference on Robotics and Mechatronics (Robomec), 4 pages (partial translation included).

* cited by examiner

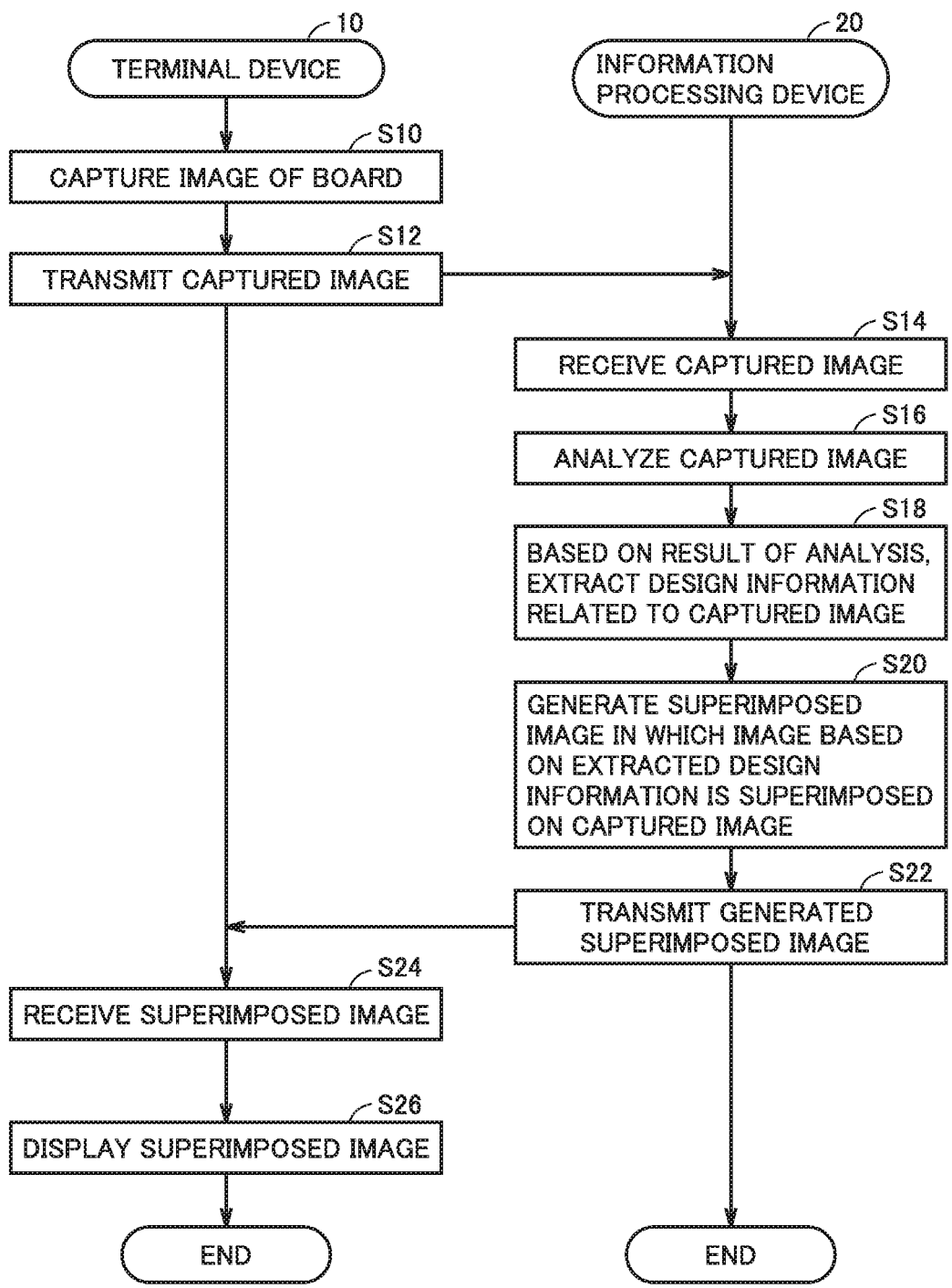

FIG.5

| Category | | | | | | 500 |
|---|---|---|---|---|---|---|
| MOUNT PART INFORMATION | PART ID | TYPE NAME | MOUNT SURFACE | MOUNT COORDINATES | MOUNTING ANGLE | |
| | TERMINAL NUMBER | TERMINAL COORDINATES 1 | TERMINAL COORDINATES 2 | TERMINAL COORDINATES 3 | | |
| PATTERN INFORMATION | INTERCONNECT SEGMENT ID | START COORDINATES | END COORDINATES | WIDTH | INTERCONNECT LAYER | |
| HOLE INFORMATION | HOLE ID | COORDINATES | HOLE DIAMETER | PERFORATED LAYER 1 (UPPER) | PERFORATED LAYER 2 (LOWER) | |
| CONNECTION INFORMATION | CONNECTION ID | PART ID 1 | TERMINAL NUMBER 1 | PART ID 2 | TERMINAL NUMBER 2 | |
| | SIGNAL NAME | | | | | |
| GRAPHIC AND TEXT INFORMATION | GRAPHIC ID | GRAPHIC COORDINATES | TEXT | TEXT COORDINATES | DISPLAY LAYER | |
| WIRING BOARD CONFIGURATION INFORMATION | NO. OF LAYERS | LAYER ID | CONDUCTIVE/NON-CONDUCTIVE | LAYER NAME | | |
| PART-SPECIFIC INFORMATION | PART WIDTH | PART LENGTH | PART HEIGHT | NO. OF ELECTRODES | ELECTRODE LENGTH | |
| | ELECTRODE WIDTH | CAPTURED IMAGE (PART) | FUNCTION | | | |
| BOARD SHAPE INFORMATION | VERTEX COORDINATES 1 | VERTEX COORDINATES 2 | VERTEX COORDINATES 3 | VERTEX COORDINATES 4 | | |

| PART ID | TYPE NAME | MOUNT SURFACE | MOUNT COORDINATES | MOUNTING ANGLE |
|---------|-----------|---------------|-------------------|----------------|
| IC1 | KAT1 | A | Xa, Ya | 0 |
| IC2 | KAT2 | A | Xb, Yb | 0 |
| IC3 | KAT3 | A | Xc, Yc | 0 |

FIG.10
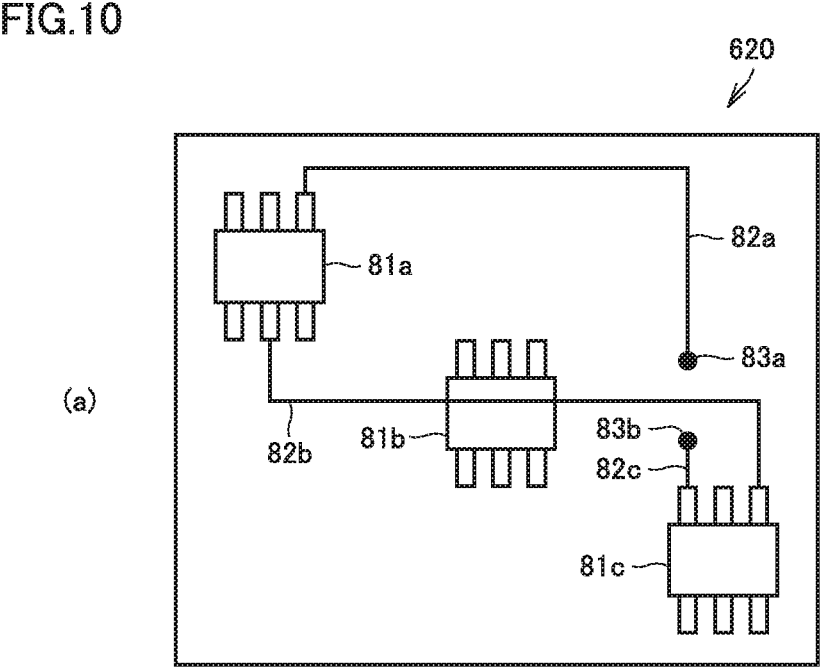
(a)
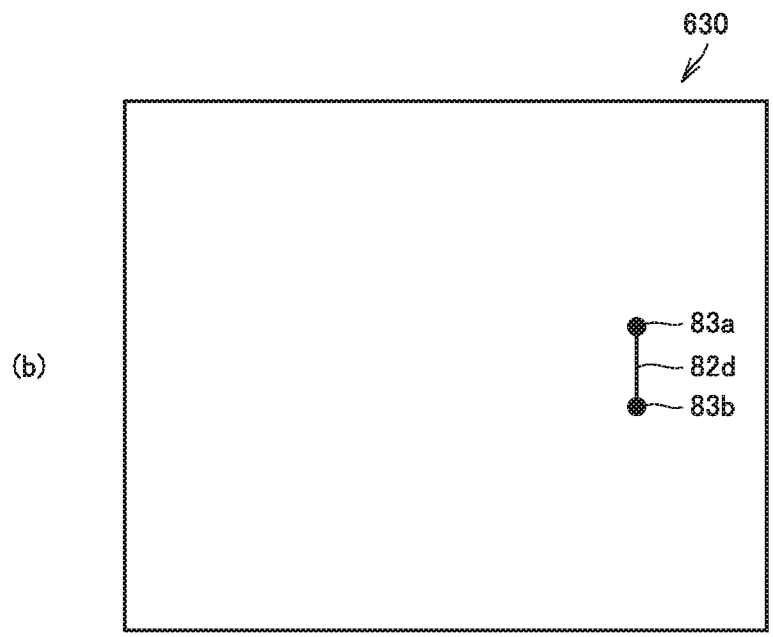
(b)

FIG.12
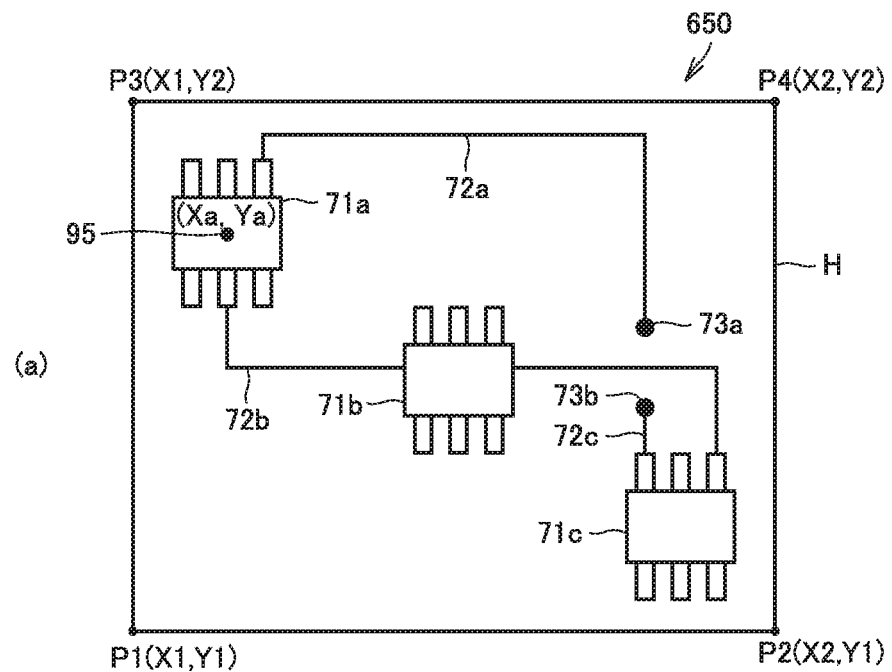
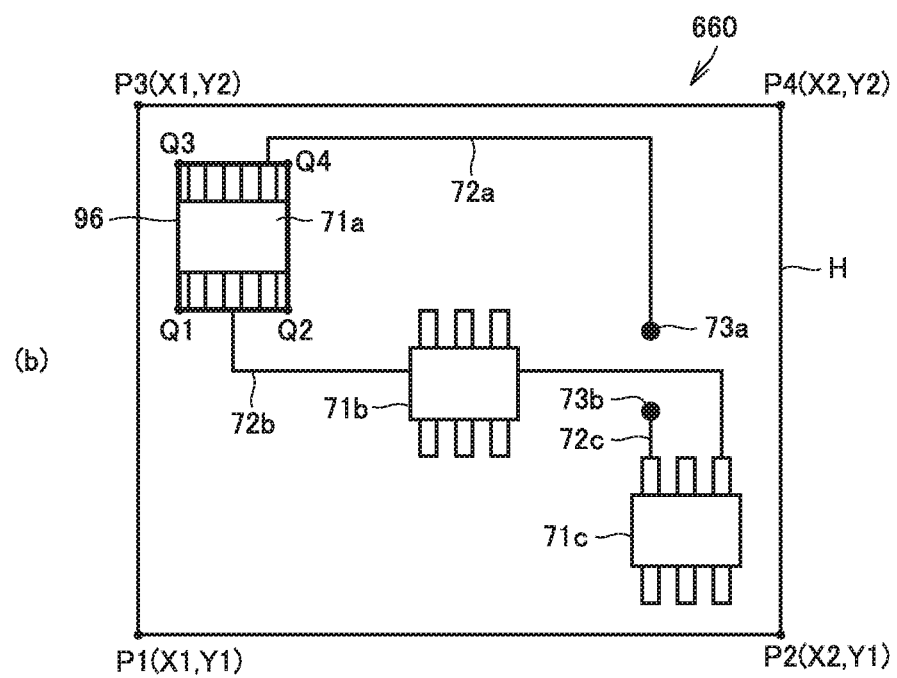

INFORMATION PROCESSING DEVICE, INFORMATION PROCESSING SYSTEM, AND NON-TRANSITORY COMPUTER-READABLE MEDIUM STORING INFORMATION PROCESSING PROGRAM

TECHNICAL FIELD

The present disclosure relates to an information processing system, an information processing device, and an information processing method.

BACKGROUND ART

Conventionally, electronic parts are commonly placed at pre-designated locations on a circuit board and inspected. For example, Japanese Patent Laying-Open No. 2016-62365 (PTL 1) discloses a placement assisting method for assisting the inspection of the placed electronic parts through image projection.

CITATION LIST

Patent Literature

PTL 1: Japanese Patent Laying-Open No. 2016-62365

SUMMARY OF INVENTION

Technical Problem

In recent years, electronic parts which are mounted on a printed board are remarkably reduced in size. A large number (e.g., several hundred to several thousands) of miniaturized electronic parts are mounted on a printed board. For this reason, often, circuit symbols, which are conventionally printed, are not printed on a printed board and electronic parts themselves. Due to this, it is difficult to keep track of wires, etc. on the printed board or electronic parts mounted on the printed board. For example, drawings with information related to the printed board are used while at work, such as development, evaluation, etc. of the printed board, which puts a large burden on the operator.

In PTL 1, inspection of the placed electronic parts through image projection is considered. This, however, does not identify individual wires, electronic parts, etc. on the printed board. Moreover, since a large number of wires and electronic parts are disposed on the printed board, it is difficult to identify them through image projection.

An object according to a certain aspect of the present disclosure is to provide an information processing system, an information processing device, and an information processing method which superimpose and display information for each of elements included in a printed board on a captured image of the printed board, thereby reducing the burden on the operator.

Solution to Problem

According to a certain embodiment, an information processing system which includes a terminal device and an information processing device is provided. The terminal device includes: an imaging unit that captures an image of at least a portion of a printed board; and a first communication unit that transmits the captured image of the at least a portion of the printed board to the information processing device. The information processing device includes: a second communication unit that receives the captured image; an extractor that extracts design information items about one or more elements constituting the at least a portion of the printed board, based on the captured image and design information items about a plurality of elements included in the printed board; and an image generator that generates an image in which images based on the design information items about the one or more elements are superimposed on the captured image. The second communication unit transmits the generated image to the terminal device. The terminal device further includes a display controller that displays the generated image, received by the first communication unit, on a display of the terminal device.

An information processing device according to another embodiment includes: an imaging unit that captures an image of at least a portion of a printed board; an extractor that extracts design information items about one or more elements constituting the at least a portion of the printed board, based on the captured image of the at least a portion of the printed board, and design information items about a plurality of elements included in the printed board; an image generator that generates an image in which images based on the design information items about the one or more elements are superimposed on the captured image; and a display controller that displays the image generated by the image generator on a display.

An information processing method according to still another embodiment: capturing an image of at least a portion of a printed board; extracting design information items about one or more elements constituting the at least a portion of the printed board, based on the captured image of the at least a portion of the printed board and design information items about a plurality of elements included in the printed board; generating an image in which images based on the design information items about the one or more elements are superimposed on the captured image; and displaying the generated image.

Advantageous Effects of Invention

According to the present disclosure, information for each of elements included in a printed board is superimposed and displayed on a captured image of the printed board, thereby relieving the burden on an operator.

BRIEF DESCRIPTION OF DRAWINGS

FIG. 4 is a flowchart for illustrating an outline of operation of an information processing system according to Embodiment 1.

FIG. 5 is a diagram showing one example data structure of a design information database according to Embodiment 1.

FIG. 10 depicts virtual representation of an image based on the design information extracted using an extraction scheme according to Embodiment 2.

FIG. 12 is a diagram showing one example superimposed image according to Embodiment 3.

DESCRIPTION OF EMBODIMENTS

Hereinafter, embodiments according to the present disclosure will be described, with reference to the accompanying drawings. In the following description, the same reference signs refer to the same components. Their names and functionalities are also the same. Thus, detailed description thereof will not be repeated.

Embodiment 1

<System Configuration>

Figure 1:
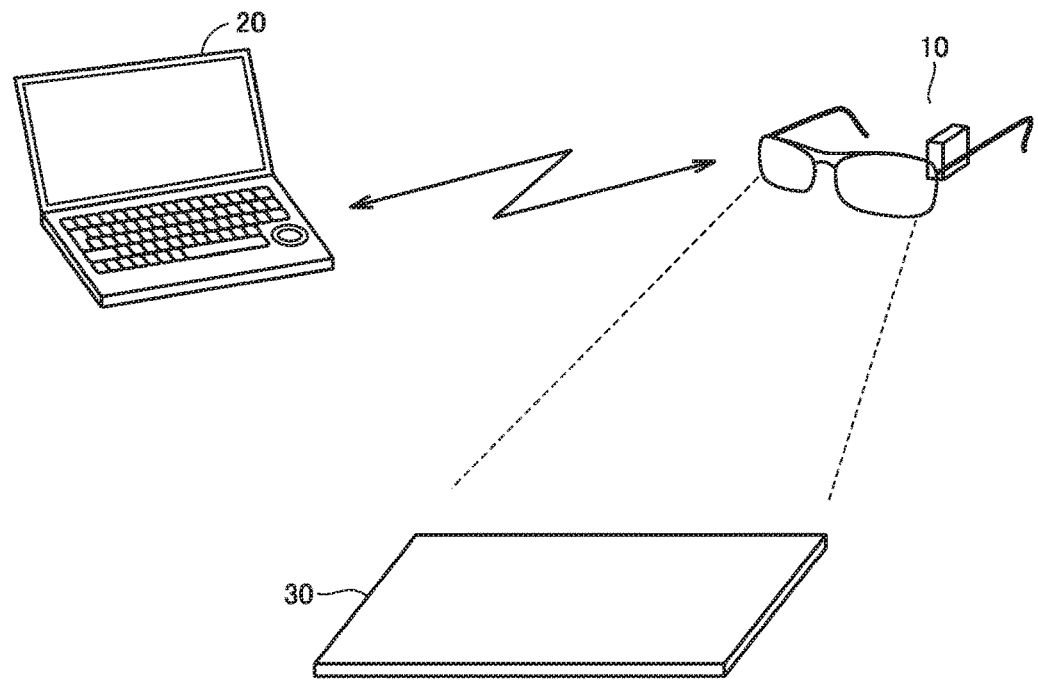
FIG. 1 is a diagram for illustrating an overall configuration of an information processing system according to Embodiment 1.

FIG. 1 is a diagram for illustrating an overall configuration of an information processing system 1000 according to Embodiment 1. Referring to FIG. 1, information processing system 1000 is a system for assisting the work during development of a board, such as fabrication, test, evaluation, etc. of a board 30 which is a printed board.

Information processing system 1000 includes a terminal device 10 and an information processing device 20. Terminal device 10 and information processing device 20 are communicable with each other. A user (e.g., an operator) of terminal device 10 and a user of information processing device 20 may be the same user or different users.

In the present embodiment, the "printed board" is a concept, including a printed wiring board before electronic parts are mounted thereon, and a printed circuit board after electronic parts are mounted thereon. Board 30 may be a printed wiring board or a printed circuit board.

Terminal device 10 is, for example, a head mounted device that can be worn on the user's head. Terminal device 10 may be any device that can execute the functionalities and processes described below. For example, terminal device 10 may be a tablet device, smartphone, etc.

Information processing device 20 is, for example, a laptop PC (personal computer). However, terminal device 10 may be any device that can execute the functionalities and processes described below. For example, terminal device 10 may be a desktop PC, a tablet device, a smartphone, etc.

Figure 2:
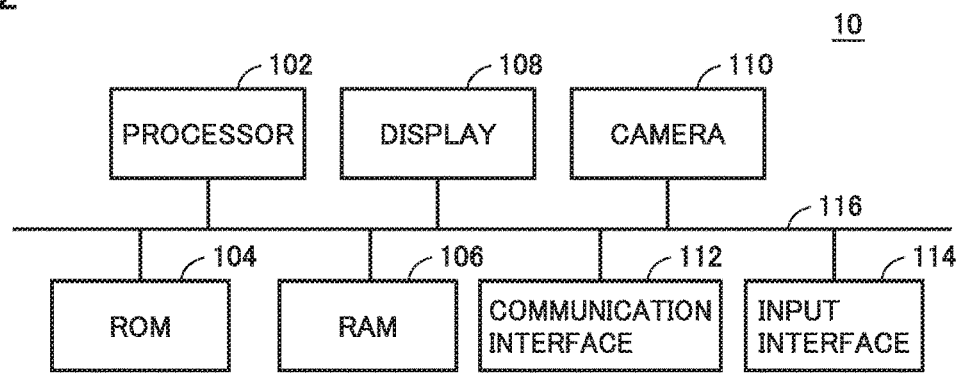
FIG. 2 is a diagram showing one example hardware configuration of a terminal device according to Embodiment 1.
Figure 3:
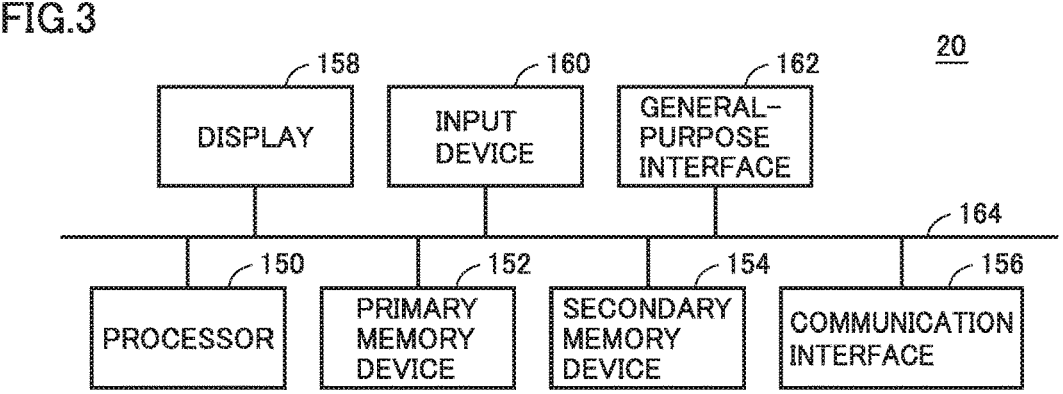
FIG. 3 is a block diagram showing one example hardware configuration of an information processing device according to Embodiment 1.

FIG. 2 is a diagram showing one example hardware configuration of terminal device 10 according to Embodiment 1. Referring to FIG. 3, terminal device 10 includes a processor 102, a ROM 104, a RAM 106, a display 108, a camera 110, a communication interface 112, and an input interface 114, which are communicably connected to one another via an internal bus 116.

Processor 102 is, typically, a processing unit, such as a CPU (central processing unit) or an MPU (multiprocessing unit), reads various programs installed in ROM 104, expands them into RAM 106, and executes them.

Display 108 is a display that can be worn on the user's head. Camera 110 is implemented by, for example, a CCD (Charge Coupled Device)-based camera, a CMOS (Complementary Metal Oxide Semiconductor)-based camera, or any other camera. Note that camera 110 have functionalities, such as a zoom function for changing zoom magnification and a focus function for adjusting the focal length.

Communication interface 112 is a communication interface for terminal device 10 to exchange various data with information processing device 20. The communication scheme for communication interface 112 may be, for example, wireless communications through Bluetooth (registered trademark), wireless LAN, etc., or wired communications using a USB (universal serial bus), etc.

Input interface 114 is, for example, buttons and receives various instructions from the user. Note that terminal device 10 may include an audio input device (e.g., a microphone), an audio output device (e.g., a loudspeaker), etc., none of which are shown.

FIG. 3 is a block diagram showing one example hardware configuration of information processing device 20 according to Embodiment 1. Referring to FIG. 3, information processing device 20 includes a processor 150, a primary memory device 152, a secondary memory device 154, a communication interface 156, a display 158, an input device 160, and a general-purpose interface 162, which are communicably connected to one another via an internal bus 164.

Processor 150 reads various programs, including an operating system (OS), installed in secondary memory device 154, expands them into primary memory device 152, and executes them. Primary memory device 152 is, typically, a volatile storage medium, such as a DRAM (dynamic random access memory), and maintains various work data necessary to execute various programs, in addition to the code of the various programs, including the OS, executed by processor 150. Secondary memory device 154 is a nonvolatile storage medium, such as a hard disk or an SSD (Solid State Drive), and maintains various design information items, in addition to various programs, including an OS.

Communication interface 156 is an interface for information processing device 20 to communicate with terminal device 10. Display 158 displays various information, according to instructions from processor 150. Input device 160, typically, includes a keyboard, a mouse, etc., and receives various settings and operations from the user.

General-purpose interface 162, typically, includes an USB (universal serial bus) interface, a RS-232C serial communication interface, and information processing device 20 exchanges data with external devices through general-purpose interface 162.

<Outline of Operation of System>

FIG. 4 is a flowchart for illustrating an outline of operation of information processing system 1000 according to Embodiment 1. Typically, each step of terminal device 10 is performed by processor 102, and each step of information processing device 20 is performed by processor 150. Here, assume that an operator is recognizing that an image of board 30, which is a workpiece, is to be captured.

Referring to FIG. 4, using camera 110, terminal device 10 captures an image of board 30 (step S10). Specifically, terminal device 10 worn on the user's head captures an image of at least a portion of board 30 according to the user's gaze. At this time, the user may enlarge or reduce the portion of board 30 which the user wishes to review, by changing the zoom magnification of camera 110.

Terminal device 10 transmits the captured image (i.e., the captured image of the at least a portion of board 30) to information processing device 20 via communication interface 112 (step S12). Note that the captured image may be any of a still image and a video image.

Information processing device 20 receives the captured image from terminal device 10 via communication interface 156 (step S14). At this time, information processing device 20 stores the captured image into secondary memory device 154. Next, according to an instruction (e.g., designation of a file name, etc.) from the operator, information processing device 20 reads design information items about board 30 stored in secondary memory device 154, and analyzes the captured image using the design information items (step S16). Specifically, information processing device 20 determines which region of board 30 is captured in the captured image.

Here, the design information items include various information items, such as electronic parts, wires, holes (e.g., via holes), printed characters, the shape of the board, etc., which are disposed on board 30. For this reason, information processing device 20 is allowed to refer to, for example, the positional relationship between the electronic parts, wires, holes, etc., to determine which region of which surface of board 30 is captured in the captured image. Based on the captured image, information processing device 20 may calculate an angle $\theta$ of the imaging axis of camera 110 relative to a plane of board 30, and refer to the calculated angle $\theta$, in addition to the above design information items to determine the region of board 30 included in the captured image.

Note that terminal device 10 may use at least one of, for example, an angular rate sensor, a geomagnetic sensor, an acceleration sensor, and a gyro sensor to detect the position and inclination of terminal device 10, and transmit information indicative of the inclination to information processing device 20. Since the inclination of the plane of board 30 is known, information processing device 20 is allowed to calculate angle $\theta$ of the imaging axis of camera 110 relative to the plane of board 30.

Based on a result of the analysis of the captured image, information processing device 20 extracts design information that is related to the captured image from among design information items about board 30 stored in secondary memory device 154 (step S18). For example, assume that information processing device 20 determines, in step S16, that the region of board 30 captured in the captured image is a rectangular region H formed between four coordinates P1 (X1, Y1), P2 (X2, Y1), P3 (X1, Y2), and P4 (X2, Y2) in board 30. In this case, information processing device 20 extracts, for example, design information items about the electronic parts, wires, and holes that are located at coordinates included in rectangular region H, as the design information items related to the captured image.

Information processing device 20 generates a superimposed image in which images based on the extracted design information items (hereinafter, also referred to as "extracted design information (items)") are superimposed on the captured image received from terminal device 10 (step S20). As described below in more detail, for example, information processing device 20 generates a superimposed image in which a character image, showing the identification information about an electronic part, is superimposed on the electronic part on the captured image, based on the design information (e.g., the mount surface, mount coordinates, a mounting angle, terminal coordinates, etc.) about the electronic part, and angle $\theta$ of camera 110 relative to board 30.

Information processing device 20 transmits the generated superimposed image to terminal device 10 via communication interface 156 (step S22). Terminal device 10 receives the superimposed image from information processing device 20 via communication interface 112 (step S24), and displays the superimposed image on display 108 (step S26).

<Design Information Database>

FIG. 5 is a diagram showing one example data structure of a design information database 500 according to Embodiment 1. Design information database 500 is a collection of data storing information necessary to fabricate a printed board virtually generated by a CAD (Computer-Aided Design) system. Specifically, design information database 500 stores design information for each of the elements included in board 30. Typically, design information database 500 is implemented by secondary memory device 154. However, design information database 500 may be implemented by an external server device.

Referring to FIG. 5, as the design information for each element, design information database 500 includes mount part information, pattern information, hole information, connection information, graphic and text information, wiring board configuration information, part-specific information, and board shape information. In the description below, "coordinates" refers to the positional information using a predetermined position on board 30 as a reference.

The mount part information relates to an electronic part mounted on board 30. Specifically, the mount part information includes a part ID, a type name, a mount surface (e.g., the top surface or the rear surface), mount coordinates (e.g., the center coordinates of the electronic part mounted on board 30), a mounting angle (e.g., an angle at which the electronic part is mounted relative to board 30), a terminal number for each terminal disposed on the electronic part, and terminal coordinates of each terminal.

The pattern information relates to an interconnect pattern. Specifically, the pattern information includes an interconnect segment ID for each of interconnect segments included in the interconnect, the start coordinates and the end coordinates of each interconnect segment, a width of each interconnect segment, and an interconnect layer indicative of a layer in which each interconnect segment is interconnected.

The hole information relates to a hole formed in board 30. Specifically, the hole information includes a hole ID, coordinates of the hole in board 30, a hole diameter, a perforated layer 1 indicative of an upper perforated layer, and a perforated layer 2 indicative of a lower perforated layer.

The connection information relates to the connection relationship between terminals of electronic parts. The connection information includes a connection ID, a part ID 1 and a terminal number 1 of one of the electronic parts connected together, a part ID 2 and a terminal number 2 of the other one of the electronic parts connected together, and the signal name of a signal exchanged between terminal number 1 and terminal number 2.

The graphic and text information relates to a graphic and text (e.g., symbol printed) on board 30. Specifically, the graphic and text information includes a graphic ID, graphic coordinates indicative of the center coordinates of the graphic, text coordinates indicative of the center coordinates of the text, and a display layer indicative of a layer on which the graphic and text are displayed.

The wiring board configuration information relates to a printed wiring board. Specifically, the wiring board configuration information includes the number of layers included in the printed wiring board, a layer ID, information indicating whether the layer is formed of a conductive material or a non-conductive material, and a name of the layer.

The part-specific information is detailed, specific information about the electronic part mounted on board 30. The part-specific information includes the part width, the part length indicative of the length of the electronic part, the part height, the number of electrodes on the electronic part, the electrode length, the electrode width, a captured image of the electronic part, and information indicative of the functionality of the electronic part.

The board shape information includes vertex coordinates 1 to 4 at four corners of board 30.

<Superimposed Image Generation Scheme>

Referring to FIGS. 6 to 9, a superimposed image generation scheme will be described. Initially, an extraction scheme will be described in detail by which the design information items related to a captured image is extracted from design information database 500.

Figures 6, 7:
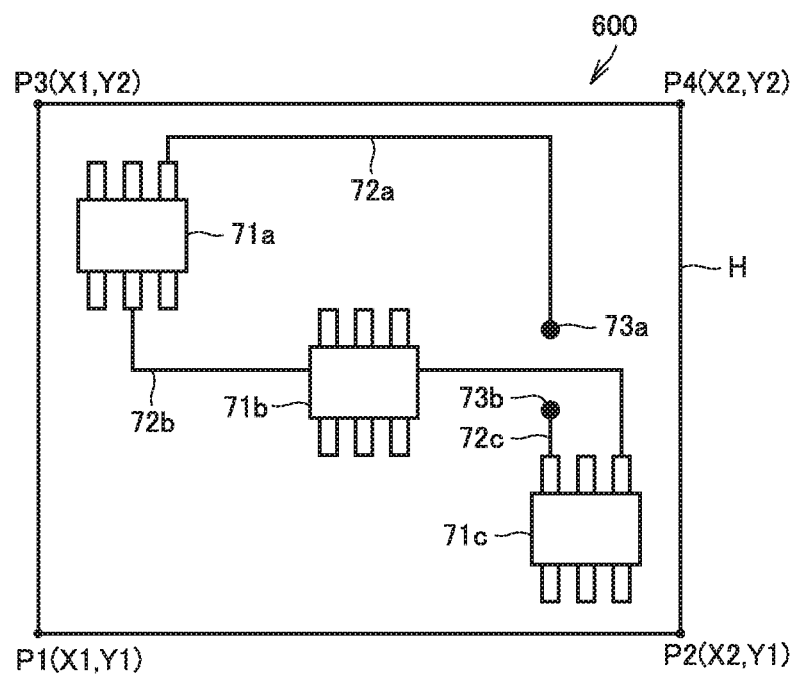
FIG. 6 is a diagram showing a captured image according to Embodiment 1.
FIG. 7 is a diagram showing one example of design information items which are extracted using an extraction scheme according to Embodiment 1.

FIG. 6 is a diagram showing a captured image 600 according to Embodiment 1. Referring to FIG. 6, captured image 600 contains electronic parts 71a, 71a, and 71c, wires 72a, 72a, and 72c, and holes 73a and 73b. Note that wire 72b is partially covered with electronic part 71b.

Information processing device 20 determines a region of board 30 that is captured in captured image 600, based on image information items about electronic parts 71a to 71c, wires 72a to 72c, and holes 73a and 73b, which are included in captured image 600, and design information items which are included in design information database 500. For example, information processing device 20 selects multiple subjects in captured image 600. Typically, the subjects are selected based on features of the subject, such as a size, a color, etc. Here, suppose that electronic parts 71a to 71c being large in size are selected as the subjects. Note that the electronic part mounted on a printed board, in general, have a black package and a silver or brown electrode, and thus the color of the electronic part can also be an indicator for the selection of a subject.

Information processing device 20 matches the images of the selected electronic parts 71a to 71c with the part-specific information (e.g., a captured image of an electronic part, the part width, the part length, the number of electrodes, etc.) to determine electronic parts that correspond to electronic parts 71a to 71c. Information processing device 20 refers to the mount part information of each electronic part determined, to obtain the mount surface, mount coordinates, etc. of the electronic part.

Next, information processing device 20 estimates the positional relationship between electronic parts from the mount surface, mount coordinates, etc. of each electronic part, compares the estimated positional relationship with the positional relationship between electronic parts 71a to 71c included in captured image 600, and, based on results of the comparison, determines a region of board 30 that is captured in captured image 600. Specifically, information processing device 20 determines that a region, where the estimated positional relationship coincides with the positional relationship between electronic parts 71a to 71c included in captured image 600, corresponds the captured region of board 30.

Note that information processing device 20 may further use a result of comparison of the positional relationship between wires 72a to 72c to the positional relationship between wires that is estimated from the pattern information (e.g., the interconnect layer, the width, the start coordinates, the end coordinates, etc.) and a result of comparison of the positional relationship between holes 73a and 73b to the positional relationship between holes that is estimated from the hole information (e.g., the coordinates, the hole diameter, etc.), to determine a region of board 30 that is captured in captured image 600.

Here, assume that captured image 600 is determined to be an image captured of rectangular region H formed between four coordinates P1 (X1, Y1), P2 (X2, Y1), P3 (X1, Y2), and P4 (X2, Y2) in board 30. In this case, information processing device 20 extracts the design information about elements (e.g., electronic part, wire, hole, graphic, text, etc.) included in rectangular region H of board 30. Information processing device 20 stores the extracted design information items into primary memory device 152 or secondary memory device 154.

FIG. 7 is a diagram showing one example of design information items which are extracted using an extraction scheme according to Embodiment 1. In the example of FIG. 7, the design information items are extracted which are about three electronic parts 71a to 71c included in captured image 600 (i.e., rectangular region H). Specifically, a part ID, a type name, a mount surface, mount coordinates, and a mounting angle are extracted as the design information. The user designates desired design information among these design information items via input device 160, adding the designated design information to captured image 600.

For example, upon receipt of designation of a part ID from the user, information processing device 20 generates a superimposed image in which a virtual image indicative of the part ID is superimposed on captured image 600, and transmits the generated superimposed image to terminal device 10. Terminal device 10 displays the superimposed image, as shown in FIG. 8, on display 108.

Figure 8:
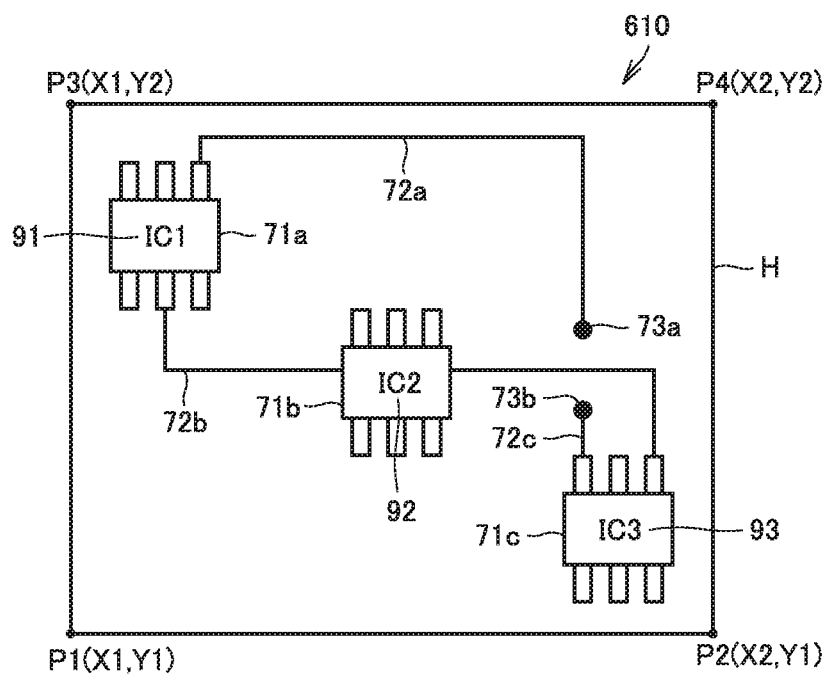
FIG. 8 is a diagram showing one example superimposed image according to Embodiment 1.

FIG. 8 is a diagram showing one example superimposed image according to Embodiment 1. Referring to FIG. 8, images 91 to 93, each showing a part ID, are superimposed on electronic parts 71a to 71c in a superimposed image 610. The user confirms superimposed image 610, thereby readily grasping that the parts ID of electronic parts 71a, 71a, and 71c are "IC1," "IC2," and "IC3," respectively.

Here, the user designates a part ID. If the user designates a type name, a mount surface, mount coordinates, etc. of the electronic part, virtual images showing design information items of these are superimposed on electronic parts 71a to 71c on captured image 600 and displayed. Note that not only some of the design information items (e.g., the part ID), but also all the design information items may be designated.

While only the design information items about electronic parts 71a to 71c are extracted in the example of FIG. 8, the present disclosure is not limited thereto. For example, if the design information items about wires 72a to 72c and holes 73a and 73b are extracted, information processing device 20 may generate an image in which virtual images showing these design information items are superimposed on captured image 600. In this case, the user is allowed to designate an element that he/she wishes to add to captured image 600 from among the extracted multiple design information items about elements and designate design information about the designated element.

Furthermore, information processing device 20 may arbitrarily toggle the display of captured image 600 and superimposed image 610 on display 158. Note that in the case of toggling the images within the same imaging range, information processing device 20 displays superimposed image 610 that is generated using the extracted design information that is already stored in primary memory device 152 or secondary memory device 154, without having to perform the above-described extraction process again.

<Functional Configuration>

Figure 9:
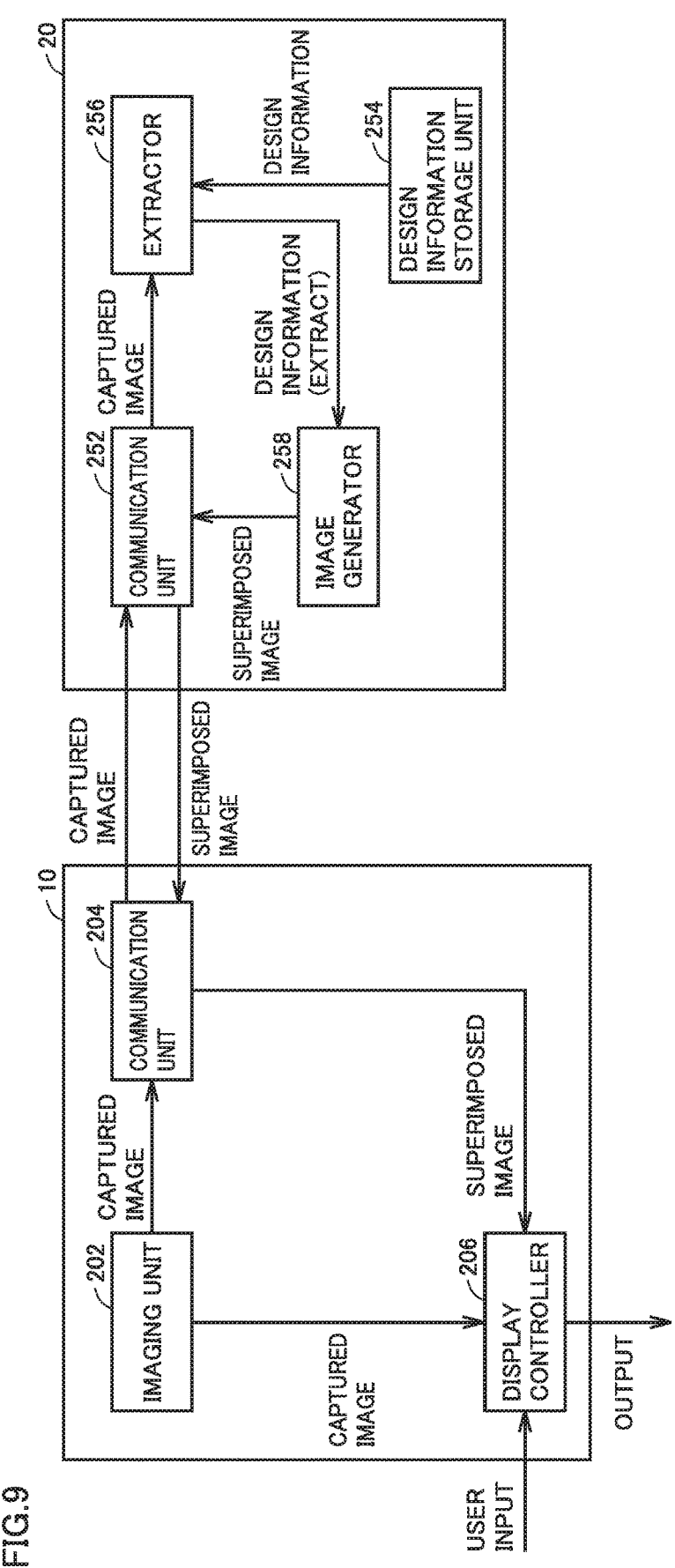
FIG. 9 is a block diagram showing one example functional configuration of the terminal device and the information processing device according to Embodiment 1.

FIG. 9 is a block diagram showing one example functional configuration of terminal device 10 and information processing device 20 according to Embodiment 1. Referring to FIG. 9, terminal device 10 includes an imaging unit 202, a communication unit 204, and a display controller 206. Information processing device 20 includes a communication unit 252, a design information storage unit 254, an extractor 256, and an image generator 258.

Referring to FIG. 9, imaging unit 202, included in terminal device 10, captures an image of at least a portion of board 30 and generates the captured image. The captured image is stored in RAM 106. Typically, imaging unit 202 is implemented by processor 102 and camera 110.

Communication unit 204 transmits the captured image (i.e., the image captured of the at least a portion of board 30), generated by imaging unit 202, to information processing device 20. Typically, communication unit 204 is implemented by processor 102 and communication interface 112.

Communication unit 252, included in information processing device 20, receives the captured image transmitted from terminal device 10. Typically, communication unit 252 is implemented by processor 150 and communication interface 156.

Design information storage unit 254 stores the design information items about multiple elements that are included in board 30. For example, design information storage unit 254 is design information database 500. Typically, design information storage unit 254 is implemented by secondary memory device 154.

Based on the captured image of the at least a portion of board 30 and the design information items about the elements included in board 30, extractor 256 extracts design information items about one or more elements that are constituting the at least a portion of board 30.

Specifically, extractor 256 compares the positional relationship between one or more elements (e.g., electronic parts, wires, holes) included in the captured image and the positional relationship between one or more elements that is derived from the design information items, and, based on a result of the comparison, extractor 256 determines a region of board 30 that is captured in the captured image. Extractor 256 then extracts the design information items about the one or more elements that are included in the determined region, as the one or more elements that are constituting the at least a portion of board 30. Typically, extractor 256 is implemented by processor 150.

Image generator 258 generates an image in which images based on the extracted design information items about the one or more elements are superimposed on the captured image. Specifically, image generator 258 generates an image in which a virtual image showing the design information about the element designated by the user is superimposed on the captured image. For example, image generator 258 generates superimposed image 610, as shown in FIG. 8. Typically, image generator 258 is implemented by processor 150.

Communication unit 252 transmits the superimposed image, generated by image generator 258, to terminal device 10. Communication unit 204, included in terminal device 10, receives the superimposed image. The superimposed image is stored in RAM 106.

Display controller 206, included in terminal device 10, displays the superimposed image on display 108. In a certain aspect, display controller 206 displays an image on display 108 which is designated by the user between the captured image captured by imaging unit 202 and the superimposed image generated by image generator 258. Display controller 206 toggles the display of the captured image and the superimposed image, for example, according to a user instruction via input interface 114.

Alternatively, display controller 206 may toggle the display of the captured image and the superimposed image, according to an instruction of information processing device 20. In this case, information processing device 20 receives user instruction information via input device 160, which indicates which one of the captured image and the superimposed image is to be displayed. Communication unit 252 transmits the instruction information to terminal device 10.

<Advantages Effects>

According to Embodiment 1, a virtual image showing the design information for each of the elements included in a printed board can be superimposed on a captured image of the printed board and displayed as augmented reality information. This does not require the operator to use drawings related to the printed board to do the work. This also reduces the workload and allows the operator to readily grasp the positions of electronic parts and the position and the signal name of wires, etc. to be disposed (or disposed) on a printed board, thereby achieving an improved working efficiency. For example, in evaluation testing work on a printed circuit board having a large number of electronic parts mounted thereon, the operator is allowed to readily grasp the functionality of each electronic part, thereby achieving an improved working efficiency in the testing work.

Embodiment 2

In general, the layer in which wires are interconnected is not limited to the top surface of a printed wiring board, and the printed wiring board includes one or more interconnect layers hidden from the top surface. For a board (i.e., a printed circuit board) which has electronic parts mounted on a printed wiring board, wires are often present which the user is prevented by the electronic parts from viewing from the top surface. Thus, Embodiment 2 will be described with respect to a configuration in which information, which the user is unable to grasp at glance from a captured image of a board, is superimposed as a virtual image on the captured image, and the superimposed image is displayed.

FIG. 10 depicts virtual representation of an image based on design information items which are extracted using an extraction scheme according to Embodiment 2. Specifically, FIG. 10 (a) depicts virtual representation of an image corresponding to a top surface layer (hereinafter, also referred to as a "surface layer") of a board 30, among images based on extracted design information items. FIG. 10 (b) depicts virtual representation of an image corresponding to an inner layer of board 30, among the images based on the extracted design information items.

Referring to FIG. 10 (a), a virtual image 620 is an image based on design information items about elements that are included in the surface layer in rectangular region H of board 30. Here, the design information items about electronic parts 71a to 71c, the design information items about wires 72a to 72c, and the design information items about holes 73a and 73b are extracted as the design information items about the elements included in the surface layer in rectangular region H.

Virtual image 620 includes part images 81a to 81c based on design information items (e.g., part-specific information, mount part information) about electronic parts 71a to 71c, wire images 82a to 82c based on design information items (e.g., pattern information) about wires 72a to 72c, and hole images 83a, 83b based on design information items (e.g., hole information) about holes 73a and 73b.

Here, captured image 600 of FIG. 6 is an actual image, and thus wire 72b is partially covered with electronic part 71b in captured image 600. In contrast, in virtual image 620 shown in FIG. 10 (a), wire image 82b based on the design information about wire 72b is not covered with part image 81b based on the design information about electronic part 71b.

Referring to FIG. 10 (b), a virtual image 630 is an image based on design information items about elements that are included in an layer (i.e., the inner layer) within rectangular region H of board 30. Specifically, virtual image 630 includes a wire image 82d and hole images 83a, 83b. Wire image 82d is a virtual image based on design information about the wire formed only in the inner layer in rectangular region H.

Figure 11:
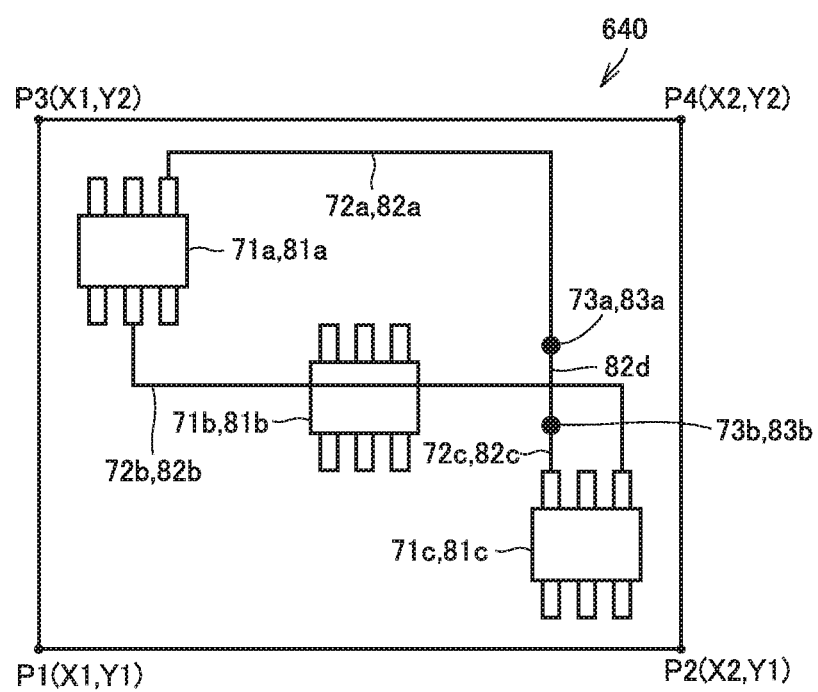
FIG. 11 is a diagram showing one example superimposed image according to Embodiment 2.

FIG. 11 is a diagram showing one example superimposed image according to Embodiment 2. Referring to FIG. 11, an information processing device 20 generates a superimposed image 640 in which virtual images 620, 630 of FIG. 10 are superimposed on captured image 600 of FIG. 6.

In superimposed image 640, part images 81a to 81c, which are virtual images, are superimposed on electronic parts 71a to 71c, wire images 82a to 82c, which are virtual images, are superimposed on wires 72a to 72c, and hole images 83a, 83b, which are virtual images, are superimposed on holes 73a and 73b. Superimposed image 640 also includes wire image 82d, which is a virtual image of the wire that is included in the inner layer of board 30 and cannot be captured by camera 110.

Terminal device 10 displays superimposed image 640, transmitted from information processing device 20, on a display 108. This allows the user to obtain information that is difficult to grasp only from captured image 600. Specifically, the user is allowed to grasp, by confirming wire image 82d, the wire that is included in the inner layer of board 30 and cannot be captured by camera 110. The user is also allowed to grasp, by confirming wire image 82b, that wire 72b continues underneath the electronic part 71b.

In the example of FIG. 10 (b), the image is based on the design information items about the elements included in the inner layer in rectangular region H of board 30. However, the present disclosure is not limited thereto. Information processing device 20 may generate an image in which virtual images, which are based on design information items about elements included in the rear surface layer in rectangular region H of board 30, are superimposed on captured image 600.

Moreover, for the sake of illustration, FIG. 11 illustrates the actual image (e.g., the electronic part image) included in captured image 600 and the virtual image (e.g., the part image) being completely superimposed one on top of the other. In practice, however, a virtual image in the form of a three-dimensional polygon or the like is generated so as to be distinguished from the actual image.

As such, in Embodiment 2, image generator 258, included in information processing device 20, generates an image in which images based on the design information items about the wires in rectangular region H of board 30 are superimposed on captured image 600. Specifically, image generator 258 generates superimposed image 640 in which wire images 82a to 82c corresponding to wires 72a to 72c in the surface layer formed in rectangular region H and wire image 82d corresponding to the wire in the inner layer in rectangular region H are superimposed on captured image 600.

Wire images 82a to 82c are superimposed on captured image 600 at respective positions that are based on the coordinates (i.e., the start coordinates and the end coordinates) of wires 72a to 72c in captured image 600. Wire image 82d is superimposed at a position that is based on the coordinates of the wire formed in the inner layer in captured image 600.

In the above, superimposed image 640 is generated in which virtual images 620 and 630 are superimposed on captured image 600. However, the present disclosure is not limited to this configuration. For example, image generator 258 may generate a superimposed image in which one of virtual images 620 and 630 is superimposed on captured image 600, according to a user instruction. Moreover, display controller 206, included in terminal device 10, may display an image that is designated by the user on display 108, between a superimposed image in which virtual image 620 is superimposed on captured image 600 and a superimposed image in which virtual image 630 is superimposed on captured image 600.

<Advantages Effects>

According to Embodiment 2, the operator is allowed to readily grasp: (i) the configuration information (e.g., a wire) about a printed wiring board that is hidden under an electronic part and the user is unable to view because the electronic part is mounted on a printed wiring board; and (ii) interconnect information provided inside the printed wiring board. This allows further improvement in the operator's working efficiency.

Embodiment 3

In Embodiments 1 and 2 described above, information processing device 20 extracts the design information for each element included in an image captured by camera 110. In Embodiment 3, information processing device 20 extracts design information about an element designated by a user, from among element design information items included in a design information database 500.

FIG. 12 is a diagram showing one example superimposed image according to Embodiment 3. Here, suppose that the user uses input device 160 to designate design information about an electronic part 71a among element design information items included in design information database 500. Also, suppose that a camera 110, included in a terminal device 10, captures an image of a rectangular region H of a board 30 in which electronic part 71a is included, and generates a captured image 600.

Referring to FIG. 12 (a), since the design information about electronic part 71a is designated by the user and electronic part 71a is included in captured image 600, information processing device 20 generates a superimposed image 650 in which a positional image 95 (e.g., a coordinate image) showing the position (e.g., mount coordinates (Xa, Ya)) of electronic part 71a is superimposed on captured image 600. In superimposed image 650, positional image 95 is superimposed on captured image 600 at a position corresponding to the mount coordinates of electronic part 71a. Terminal device 10 displays superimposed image 650 on a display 108.

As another example, referring to FIG. 12 (b), information processing device 20 generates a superimposed image 660 in which a positional image 96 (e.g., an image demarcating the footprint of electronic part 71a) showing the position of electronic part 71a (e.g., a region occupied by electronic part 71a) is superimposed on captured image 600. Terminal device 10 displays superimposed image 660 on display 108.

Note that the footprint of electronic part 71a is calculated based on mount coordinates (Xa, Ya), part length L, and part width W of electronic part 71a. The footprint is a rectangular region formed between four vertex coordinates Q1 (Xa−L/2, Ya−W/2), Q2 (Xa+L/2, Ya−W/2), Q3 (Xa−L/2, Ya+W/2), and Q4 (Xa+L/2, Ya+W/2).

Next, referring to FIG. 13, a configuration will be described in which if an element designated by the user is not included in captured image 600, an image is generated in which an image (e.g., an arrow) showing the position of the designated element is superimposed on captured image 600.

Figure 13:
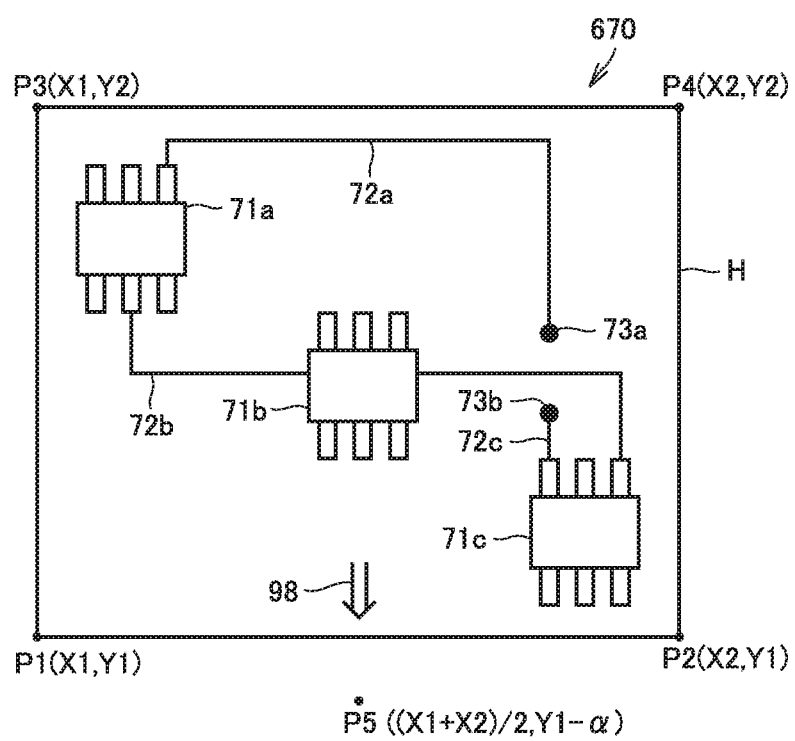
FIG. 13 is a diagram showing another example superimposed image according to Embodiment 3.

FIG. 13 is a diagram showing another example superimposed image according to Embodiment 3. Here, suppose that mount coordinates of an electronic part designated by the user is P5 ((X1+X2)/2, Y1−a). Captured image 600 is an image captured of rectangular region H formed between vertex coordinates P1 (X1, Y1), P2 (X2, Y1), P3 (X1, Y2), and P4 (X2, Y2) in board 30. Thus, coordinate P5 is not included in captured image 600.

Referring to FIG. 13, information processing device 20 calculates the position of coordinate P5 relative to rectangular region H, and, based on a result of the calculation, generates a superimposed image 670 in which a positional image 98, showing the position of coordinate P5, is superimposed on captured image 600. Specifically, the position of coordinate P5 relative to rectangular region H is below the rectangular region H. Thus, for example, positional image 98 is generated in the form of an arrow indicating the downward direction. This facilitates the user to include the user-designated electronic part in the imaging range of camera 110.

As described above, in Embodiment 3, image generator 258, included in information processing device 20, generates an image in which a positional image, showing the position of a user-designated element (hereinafter, also referred to as a "designated element") among multiple elements included in board 30, is overlapped on captured image 600, based on the positional information (e.g., coordinates) about the designated element.

Specifically, image generator 258, initially, determines whether the designated element is included in captured image 600. If the imaging range of camera 110 (e.g., rectangular region H) includes the coordinates of the designated element, image generator 258 determines that the designated element is included in captured image 600. Otherwise, image generator 258 determines that the designated element is not included in captured image 600.

If captured image 600 includes the designated element, image generator 258 generates a superimposed image (e.g., superimposed images 650, 660) in which the positional image (e.g., positional images 95, 96) showing the position of the designated element is superimposed on captured image 600. If captured image 600 does not include the designated element, image generator 258 generates a superimposed image (e.g., superimposed image 670) in which the positional image (e.g., positional image 98) showing the position of the designated element is superimposed on captured image 600.

<Advantages Effects>

According to Embodiment 3, even for an element whose position on the printed board is unknown, an image showing the position of the element is superimposed on the captured image and displayed by the user designating the element. This allows further improvement in the operator's working efficiency.

OTHER EMBODIMENTS (1) In the embodiments described above, the user recognizes that a workpiece board is board 30 and information processing device 20 reads design information items about board 30 according to a user instruction. However, the present disclosure is not limited to this configuration. The user may not recognize that the workpiece board is board 30.

In this case, information processing device 20 obtains a profile shape of the board and mount coordinates information items about any number of (three to five) electronic parts from a captured image of the entire workpiece board. Based on the profile shape of the board and mount coordinates information items obtained, information processing device 20 extracts corresponding board information from among multiple board information items stored in a design information database, thereby determining that the workpiece board is board 30.

Board identification information (e.g., a linear barcode, a two-dimensional barcode, a letter symbol, etc.) may also be provided on the workpiece board. In this case, information processing device 20 analyzes a captured image including the board identification information, thereby determining that the workpiece board is board 30.

(2) In the embodiments described above, terminal device 10 and information processing device 20 are separate components. However, these devices may be configured by a device that has the functionalities of the two integrated together. For example, information processing device 20 may be a device which has the functionalities of imaging unit 202 and display controller 206 included in terminal device 10. In this case, information processing device 20 has the functionalities of imaging unit 202, display controller 206, design information storage unit 254, extractor 256, and image generator 258. Information processing device 20 is, for example, a tablet device which includes camera 110. Display controller 206 displays the above-described captured image 600 and superimposed images 610, 640 to 670 on display 158 of information processing device 20.

(3) The configurations illustrated as the embodiments described above are one example configuration of the present disclosure, and can be combined with another known technique, and any modification, such as omitting a part of the configuration, can be made, without departing from the gist of the present disclosure.

In the embodiments described above, the processes and configurations described in other embodiments may be adopted as appropriate.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST

10 terminal device; 20 information processing device; 30 board; 71a to 71c electronic parts; 72a to 72c wire; 73a,73b hole; 81a to 81c part image; 82a to 82d wire image; 83a,83b hole image; 620, 630 virtual image; 95, 96, 98 positional image; 102,150 processor; 104 ROM; 106 RAM; 108,158 display; 110 camera; 112,156 communication interface; 114 input interface; 116,164 internal bus; 152 primary memory device; 154 secondary memory device; 160 input device; 162 general-purpose interface; 202 imaging unit; 204, 252 communication unit; 206 display controller; 254 design information storage unit; 256 extractor; 258 image generator; 500 design information database; 600 captured image; 610, 640, 650, 660, 670 superimposed image; and 1000 information processing system.

The invention claimed is:

1. An information processing device, comprising:
a processor configured to:
based on a captured image of at least a portion of a printed board, determine the portion of the printed board based on identification of a subset of one or more elements of a set of elements constituting at least the portion of the printed board, wherein the subset of one or more elements has fewer elements than the set of elements;
extract design information items about the set of elements constituting at least the determined portion of the printed board, based on the determined portion of the printed board and design information items about a plurality of elements included in the printed board, wherein the extracted design information items about the set of elements includes a design information item about an element other than the subset of one or more elements; and
generate an image in which images based on the design information items about the set of elements are superimposed on the captured image, wherein
the set of elements include a wire formed inside the printed board,
the processor is configured to generate an image in which images based on design information about the wire formed at the determined portion of the printed board is superimposed on the captured image, and
the image generated by the processor is displayed on a display.

2. The information processing device according to claim 1, wherein
the set of elements include an electronic part disposed on the printed board, and
the processor is configured to generate an image in which an image based on design information about the electronic part included in the captured image is superimposed on the electronic part.

3. The information processing device according to claim 2, wherein
the set of elements include a wire formed on a top surface of the printed board.

4. The information processing device according to claim 2, further comprising
a display controller that displays the image generated by the processor on the display.

5. The information processing device according to claim 1, wherein
the set of elements include a wire formed on a top surface of the printed board.

6. The information processing device according to claim 5, further comprising
a display controller that displays the image generated by the processor on the display.

7. The information processing device according to claim 1, further comprising
a display controller that displays the image generated by the processor on the display.

8. The information processing device according to claim 7, wherein
between the captured image and the image generated by the processor, the display controller displays an image designated by a user on the display.

9. An information processing system, comprising:
the information processing device according to claim 8; and
a terminal device that captures the captured image, wherein
the terminal device includes:
the display; and
a display controller that displays the image generated by the processor on the display.

10. The information processing system according to claim 9, wherein
between the captured image and the image generated by the processor, the display controller displays an image designated by a user on the display.

11. An information processing device, comprising:
a processor configured to:
based on a captured image of at least a portion of a printed board, determine the portion of the printed board based on identification of a subset of one or more elements of a set of elements constituting at least the portion of the printed board, wherein the subset of one or more elements has fewer elements than the set of elements;
extract design information items about the set of elements constituting at least the determined portion of the printed board, based on the determined portion of the printed board and design information items about a plurality of elements included in the printed board, wherein the extracted design information items about the set of elements includes a design information item about an element other than the subset of one or more elements; and
generate an image in which images based on the design information items about the set of elements are superimposed on the captured image; and
a keyboard or a mouse configured to receive information about an element externally designated, wherein:
the design information about the element includes positional information indicative of a position of the element on the printed board,
the processor is configured to generate, based on the positional information of the designated element among the plurality of elements included in the printed board:
an image in which a positional image showing a position of the designated element is superimposed on the captured image, when the designated element is included in the captured image; and
an image in which information showing the position of the designated element is superimposed on the captured image, when the designated element is not included in the captured image, and
the image generated by the processor is displayed on a display.

12. The information processing device according to claim 11, wherein
the set of elements include an electronic part disposed on the printed board, and
the processor is configured to generate an image in which an image based on design information about the electronic part included in the captured image is superimposed on the electronic part.

13. The information processing device according to claim 11, wherein
the set of elements include a wire formed on a top surface of the printed board.

14. The information processing device according to claim 11, further comprising
a display controller that displays the image generated by the processor on the display.

15. A non-transitory computer-readable medium storing an information processing program executed by a processor, the information processing program causing the processor to perform:
determining, based on a captured image of at least a portion of a printed board, the portion of the printed board based on identification of a subset of one or more elements of a set of elements constituting at least the portion of the printed board, wherein the subset of one or more elements has fewer elements than the set of elements;
extracting design information items about the set of elements constituting the determined portion of the printed board, based on the determined portion of the printed board and design information items about a plurality of elements included in the printed board, wherein the extracted design information items about the set of elements includes a design information item about an element other than the subset of one or more elements, and
generating an image in which images based on the design information items about the set of elements are superimposed on the captured image, wherein
the set of elements include a wire formed inside the printed board,
the generating includes generating an image in which an image based on design information about the wire formed at the determined portion of the printed board is superimposed on the captured image, and
the image generated by the generating is displayed on a display.

16. A non-transitory computer-readable medium storing an information processing program executed by a processor, the information processing program causing the processor to perform:
determining, based on a captured image of at least a portion of a printed board, the portion of the printed board based on identification of a subset of one or more elements of a set of elements constituting at least the portion of the printed board, wherein the subset of one or more elements has fewer elements than the set of elements;
extracting design information items about the set of elements constituting the determined portion of the printed board, based on the determined portion of the printed board and design information items about a plurality of elements included in the printed board, wherein the extracted design information items about the set of elements includes a design information item about an element other than the subset of one or more elements;
generating an image in which images based on the design information items about the set of elements are superimposed on the captured image; and
receiving information about an element externally designated, wherein
the design information about the element includes positional information indicative of a position of the element on the printed board,
the generating includes generating, based on the positional information of the designated element among the plurality of elements included in the printed board:
an image in which a positional image showing a position of the designated element is superimposed on the captured image, when the designated element is included in the captured image; and
an image in which information showing the position of the designated element is superimposed on the captured image, when the designated element is not included in the captured image, and
the image generated by the generating is displayed on a display.

* * * * *